(12) United States Patent
Palfenier et al.

(10) Patent No.: US 6,736,355 B2
(45) Date of Patent: May 18, 2004

(54) ARRANGEMENT AND BRACKET FOR A SENSOR

(75) Inventors: Samuel Roland Palfenier, El Paso, TX (US); Luis F Barron, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/171,875

(22) Filed: Jun. 14, 2002

(65) Prior Publication Data

US 2003/0230689 A1 Dec. 18, 2003

(51) Int. Cl.$^7$ .................................................. F16L 3/08
(52) U.S. Cl. ......................................... 248/70; 248/74.3
(58) Field of Search .................. 248/74.1, 65, 541, 248/534, 311.2, 218.4, 227.3, 309.1, 56, 62, 66, 67, 69, 71, 176.1, 346.01, 346.04, 70, 74.2, 74.3; 403/382, 187, 188, 189; 211/26, 60.1, 85.29; 29/434, 468, 525.11, 525.12, 439, 510

(56) References Cited

U.S. PATENT DOCUMENTS

| | | | | |
|---|---|---|---|---|
| 2,423,627 A | * | 7/1947 | Tinnerman | 439/100 |
| 2,464,620 A | * | 3/1949 | Tinnerman | 248/74.3 |
| 2,946,546 A | * | 7/1960 | Pokorny et al. | 248/534 |
| 2,994,499 A | * | 8/1961 | Waters | 248/74.3 |
| 4,153,228 A | * | 5/1979 | Delserro et al. | 248/74.3 |
| 4,442,994 A | * | 4/1984 | Logsdon | 248/547 |
| 4,535,960 A | * | 8/1985 | Downing et al. | 248/74.5 |
| 4,709,889 A | * | 12/1987 | Erickson | 248/74.5 |
| 5,301,917 A | * | 4/1994 | Dyer | 248/74.2 |
| 5,344,111 A | * | 9/1994 | Gantzert | 248/274.1 |
| 5,377,940 A | * | 1/1995 | Cabe et al. | 248/74.3 |
| 5,839,703 A | * | 11/1998 | Tesar | 248/65 |
| 6,152,412 A | * | 11/2000 | Basickes et al. | 248/317 |
| 6,176,636 B1 | | 1/2001 | Stevenson et al. | 403/13 |
| 6,209,833 B1 | * | 4/2001 | Chenault | 248/230.8 |
| 6,338,190 B1 | | 1/2002 | Stevenson et al. | 29/434 |
| 6,398,170 B1 | * | 6/2002 | Wada | 248/74.5 |
| 6,508,442 B1 | * | 1/2003 | Dolez | 248/74.1 |

FOREIGN PATENT DOCUMENTS

GB 2074013 A * 10/1981 ............. F16L/3/12

\* cited by examiner

*Primary Examiner*—Leslie A. Braun
*Assistant Examiner*—A. Joseph Wujciak
(74) *Attorney, Agent, or Firm*—Jimmy L. Funke (57) ABSTRACT

An arrangement for mounting a sensor at a fixed position with respect to a target is provided. The arrangement includes a housing for the sensor. A mount is provided spaced away from target having a bore. A fastener is provided for insertion into the bore. Fastener has a shank with a tapered portion. A looped bracket is provided having an eyelet for encircling the housing. The bracket has two opposite ends that are at least partially overlapping having generally aligned holes for reception of the shank. One of the bracket ends has a wedge tab. Upon insertion of the shank into the bore the wedge tab is contacted by the tapered portion of the shank to cause the bracket eyelet to close to capture the housing.

21 Claims, 6 Drawing Sheets

ARRANGEMENT AND BRACKET FOR A SENSOR

TECHNICAL FIELD

The present invention relates to an arrangement and bracket for holding a sensor such as a magnetic sensor in a fixed position with respect to a target.

BACKGROUND OF THE INVENTION

Magnetic sensors operate on the principle of detecting magnetic flux density modulation caused by the movement of an appropriately configured target (or targets). The magnetic sensor must be affixed very close to the target since its sensitivity decreases very rapidly with the size of the air gap between the target and the magnetic sensor. In most automotive applications, for example, the air gaps are on the order of 0.3 to 1.75 mm. Over such a range of air gaps, the sensor output signal decreases more than ten times. The signal attenuation at large air gaps makes the sensor operation more prone to noise induced failures as well as less accurate in detecting the elements of the target as it spins in relation to the magnetic sensor. Both of these factors are often unacceptable in critical engine control and diagnostic applications.

However, in the majority of production cases, the stack-up of tolerances of the many different components randomly influence the net size of the air gap, which consequently precludes achieving, at each assembly, a precisely predetermined air gap by mere assembly of the parts. As a result, because of the random variations caused by accumulation of tolerances, mere assembly of the parts risks damaging interference between the magnetic sensor and target on the one hand, and inaccurate readings associated with too large an air gap on the other hand. To lessen all the tolerances so that mere assembly assures, at each assembly, the optimum air gap is physically unrealistic and involves inordinate costs associated with manufacturing such precise parts.

The majority of magnetic sensors used in automotive applications involve non-adjustable air gap placement, wherein the stack-up of tolerances causes deviation from the optimal air gap. For example, a rigid bracket is affixed to the body of a magnetic sensor. The magnetic sensor is placed into a sensor port in the engine block, and the bracket is bolted, via a bolt hole in the bracket, to a threaded mounting hole in a mounting surface of the engine block. When the bracket is bolted, the length of the sensor body from the sensor port surface to the sensor tip determines the air gap with respect to the target, which air gap is affected by the stack-up of tolerances. Even though subject to tolerance related placement inaccuracy, this structural mounting methodology is used widely because of the simplicity of the hardware, and ease of assembly and service.

In situations where air gap variation cannot be tolerated, the air gap is preset during magnetic sensor installation by means of an adjustable bracket, often referred to as a "side mount" bracket. The adjustability of side mount brackets resides in a bolt slot which allows for the bracket to be adjusted along the slot elongation relative to the threaded mounting hole of the mounting surface.

In one form of operation of a side mount bracket, the sensor body is placed into the sensor port of the engine block such that the sensor tip is allowed to touch the surface of the target, and then it is withdrawn a distance equal to the predetermined optimum air gap. This method is more time consuming and is error prone.

In the prior art, it is known to precisely adjust the air gap using a threaded sensor body and threaded sensor port. This structure is generally used exclusively with magnetic sensors having a single sensing element and having sensing capability unaffected by sensor rotation around its longitudinal axis. In this approach, the sensor tip is brought into touching engagement with the target, and then the sensor body is rotated a predetermined angular amount, wherein the pitch angle of the threads raises the tip a distance equal to the optimum air gap. However, most automotive magnetic sensors contain more than one sensing element and are designed to operate at only one particular angular setting around the sensor axis. Consequently, a threaded sensor body would need to be adjusted in whole revolution steps (i.e., 360 degrees) and air gap adjustment would then be in steps of the thread pitch. While the use of a sufficiently small pitch may render the air gap setting resolution adequate, many sensors are precluded from rotation due to geometrical interferences.

To overcome the above-noted deficiencies, a sensor bracket or system of Stevenson, et al., U.S. Pat. No. 6,176, 636 has been brought forth. Stevenson, et al. has a two-component bracket and drive washer combination which provides secure holding of a magnetic sensor while automatically setting an optimal air gap. Stevenson, et al. has a main bracket component having an aperture and a drive wall at one end of the aperture. A sensor body is connected to the main bracket component and is allowed to touch a target. A reaction bracket has a reaction wall in the aperture opposite the drive wall and is restrained from moving. A drive washer is provided with teeth having a pitch whereby as the washer is pressed between the drive and reaction walls along a transverse axis. The main bracket component is forced to move along a longitudinal axis, thereby moving the sensor body in relation to the target an amount precisely equal to a desired air gap. It is desirable to provide an arrangement for holding a sensor in a fixed position which is less expensive than that provided in Stevenson, et al. and wherein the bracket can possibly fabricated from a stamped sheet metal.

SUMMARY OF INVENTION

The present invention brings forth an arrangement for mounting a sensor at a fixed position with respect to a target. The arrangement includes a housing for a sensor. The arrangement also includes a mount spaced away from the target having a bore. A fastener is provided for insertion into the bore. The fastener has a shank with a tapered portion and also a head. A loop bracket is provided having an eyelet for encircling the housing. The bracket has at least partially overlapping opposite ends which have generally aligned holes for reception of the fastener shank. One of the brackets has a wedge tab. Upon insertion of the fastener shank into the bracket the wedge tab of the bracket makes contact with the tapered portion causing the bracket eyelet to close and capture the housing.

The present invention will now be explained by example with reference to the accompanying drawings.

DESCRIPTION OF AN EMBODIMENT OF THE INVENTION

Referring to FIGS. 1, 3, 4, 11 and 13, the arrangement 7 for mounting a sensor at a fixed position with respect to a target includes a bracket 10. The bracket 10 is looped and has an eyelet 12. The bracket has a first lower end 16. The bracket also has an opposite upper end 18. The upper and lower ends of the bracket 18 and 16 are at least partially overlapping. The lower end of the bracket 16 has a fastener hole 22. The upper end of the bracket has a fastener hole 24. The fastener holes 22 and 24 are generally aligned with each other.

The eyelet 12 has two generally radially inward extending eyelet tabs 25. The eyelet tabs 25 have a radially inward extreme edge 26. The upper bracket end 18 has a punched-out wedge tab 27. The wedge tab 27 has an extreme edge 28. The other lower bracket end 16 has a punched out biasing tab 30. The biasing tab 30 has an inboard surface 32 which can abut with a lateral surface 34 of the upper end. The abutment of the inboard surface 32 and the lateral surface 34 can be used to prevent the upper and lower ends 18, 16 from angularly separating from one another. The upper end also has a contact surface formed by a dimple or mound 36. The lower end 16 also has an angled portion 38. The angled portion 38 will typically make an angle 39 between 1° and 5° with respect to the remainder of the lower end 16. Angle 39 will typically be 2° plus or minus 0.5°. The end portion 38 of the lower end is preferably positioned underneath the mound 36 of the upper end 18.

Figure 2:
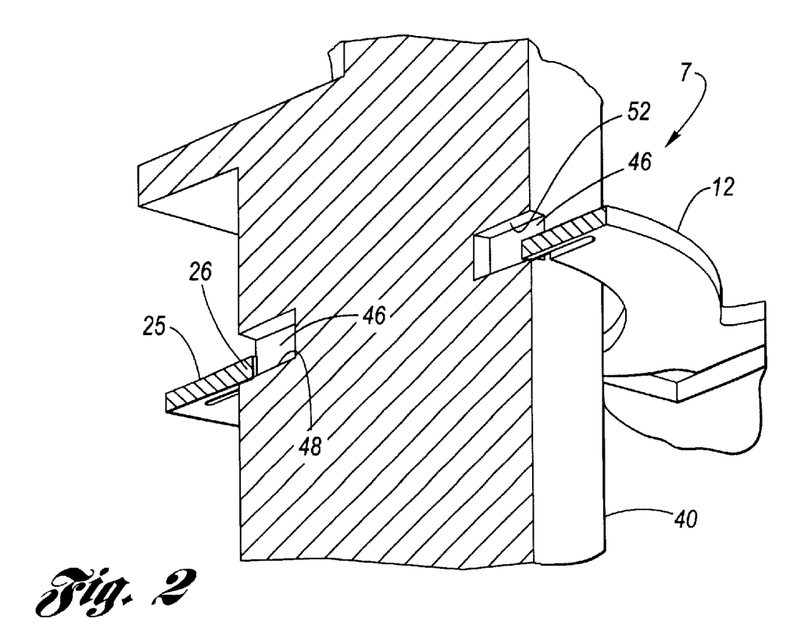
FIG. 2 is a sectional view of the bracket and sensor housing shown in FIG. 1.
Figure 5:
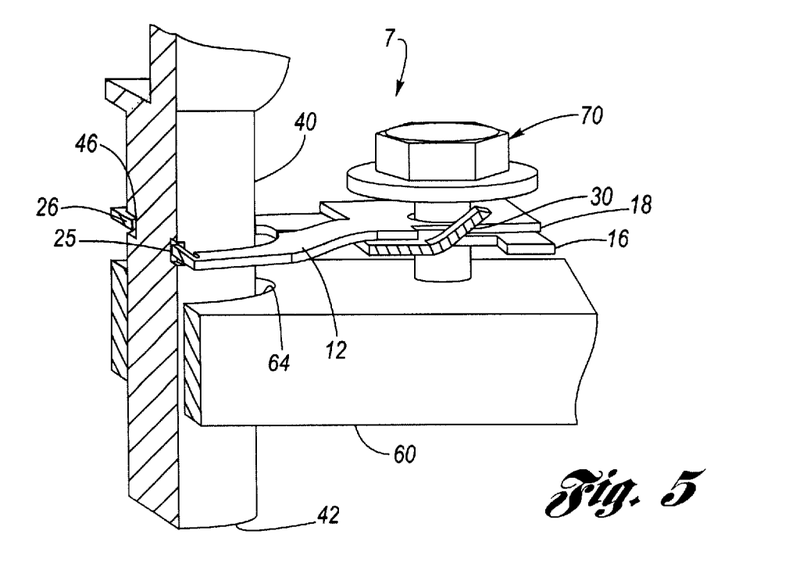
FIG. 5 is a perspective view of the present invention illustrating the bracket and housing as shown in FIG. 1 upon initial insertion of a fastener.
Figure 6:
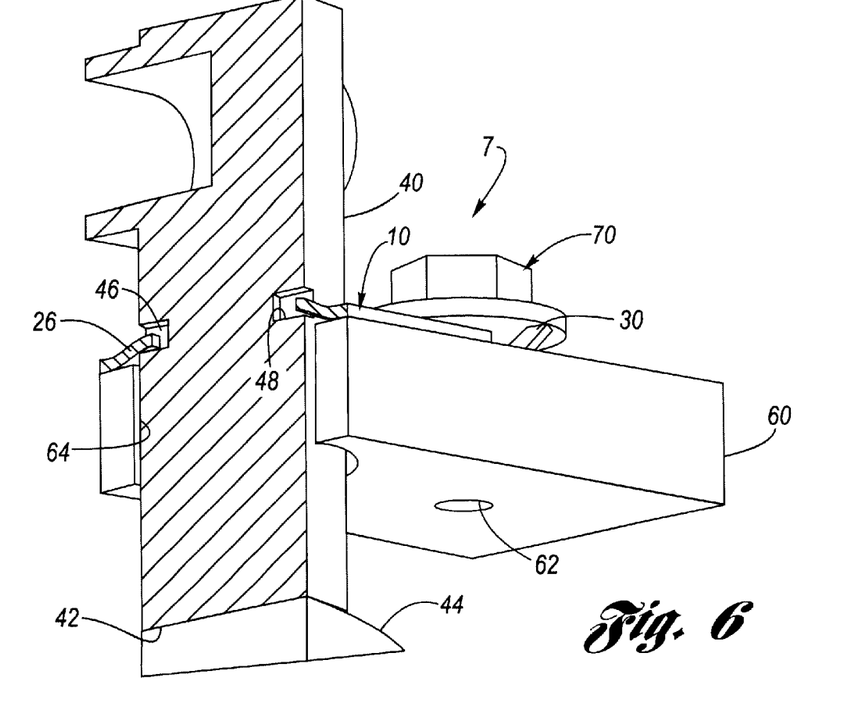
FIG. 6 is a view similar to that of FIG. 5 illustrating the contact of a sensor housing against a reluctor target.

Referring additionally to FIGS. 2, 5 and 6 a sensor or sensors (not shown) are housed in a housing 40. The housing 40 has an extreme end 42 which is positioned as will be explained later, a fixed distance from a reluctor target 44. The housing 40 has geometrically opposed notches 46. The notches 46 are provided for reception of the eyelet tabs 25. The notches 46 have a lower surface 48 and an upper surface 52. An upper end of the housing 40 has an elbow 54 to allow for reception of cabling to the sensor.

Figures 3, 4:
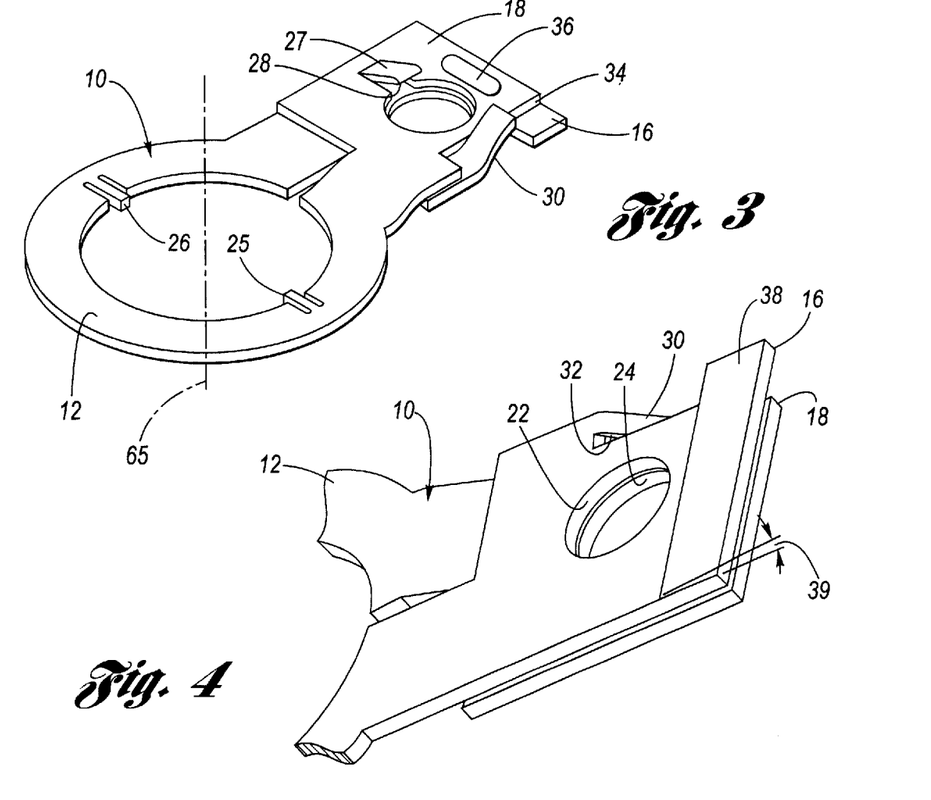
FIG. 3 is a perspective view of the bracket shown in FIG. 1.
FIG. 4 is an enlarged bottom perspective view of a portion of a bracket shown in FIG. 1.
Figure 8:
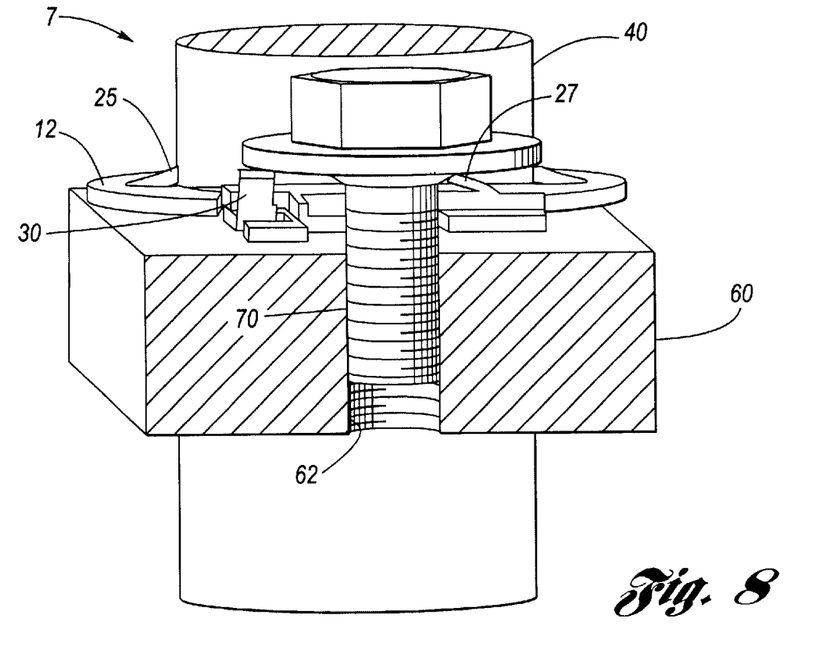
FIG. 8 is a rear perspective view of the sensor mounting arrangement shown in FIG. 6.
Figure 9:
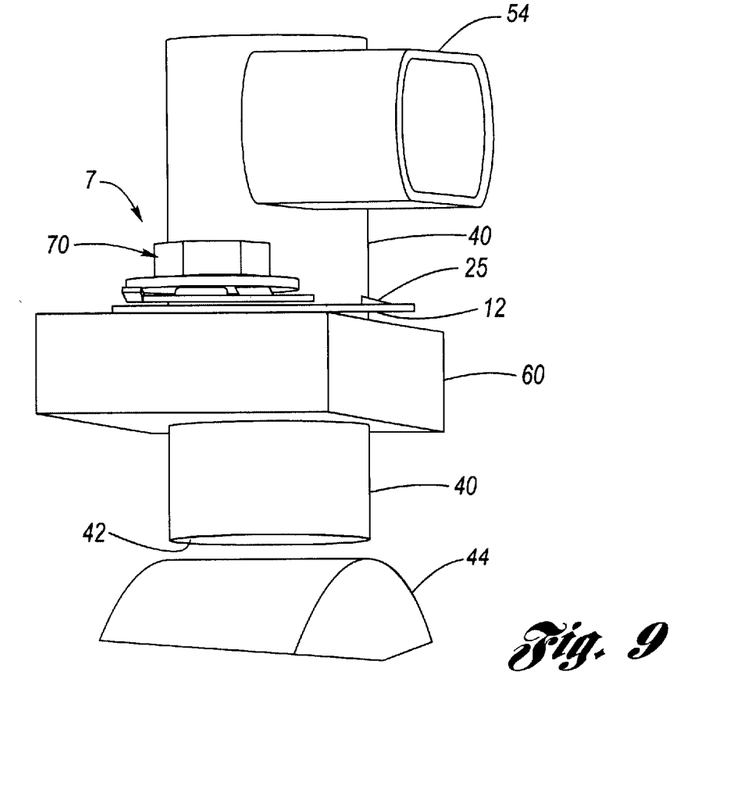
FIG. 9 is a rear perspective view of the mounting arrangement wherein the fastener has been inserted to the point wherein the housing has been lifted away from the target establishing an air gap.
Figure 10:
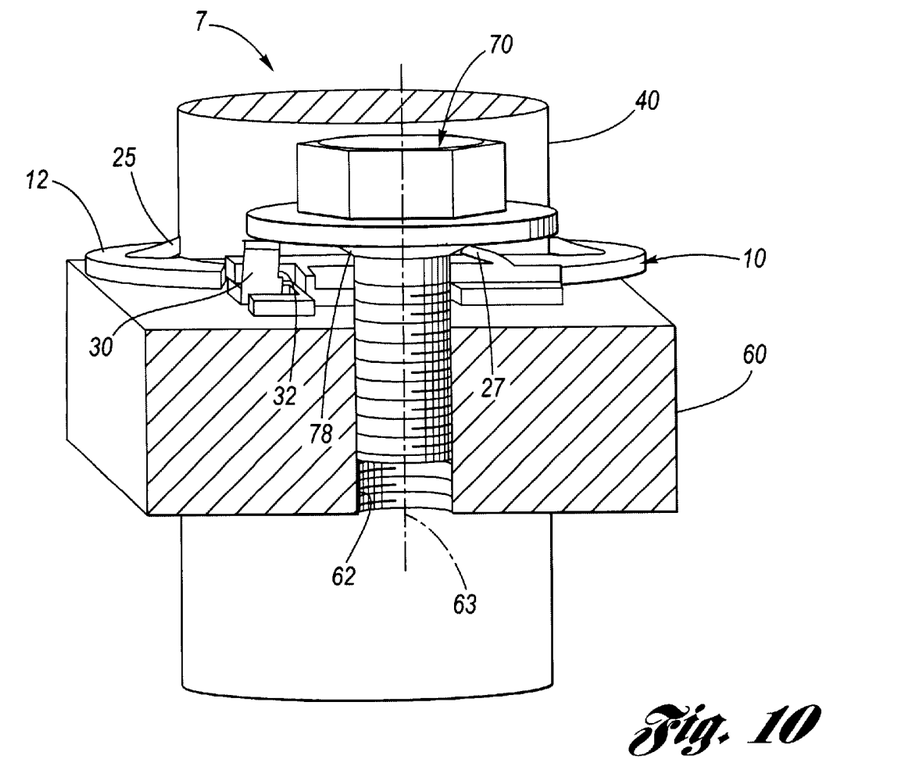
FIG. 10 is a sectional view illustrating the position of the fastener wherein the bracket is about to capture the housing.
Figure 11:
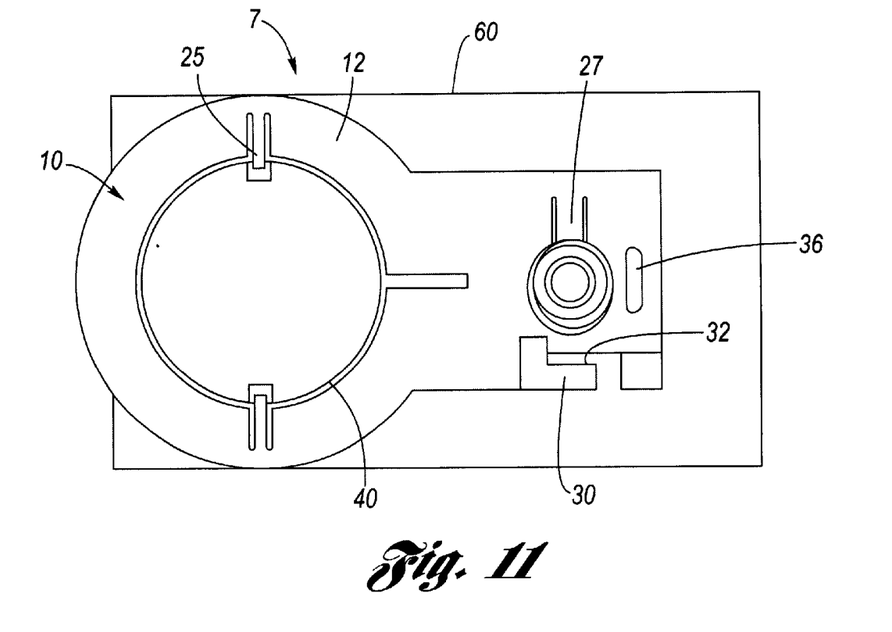
FIG. 11 is a sectional view taken about the sensor positioning arrangement when it corresponds to the position shown in FIG. 6.
Figure 12:
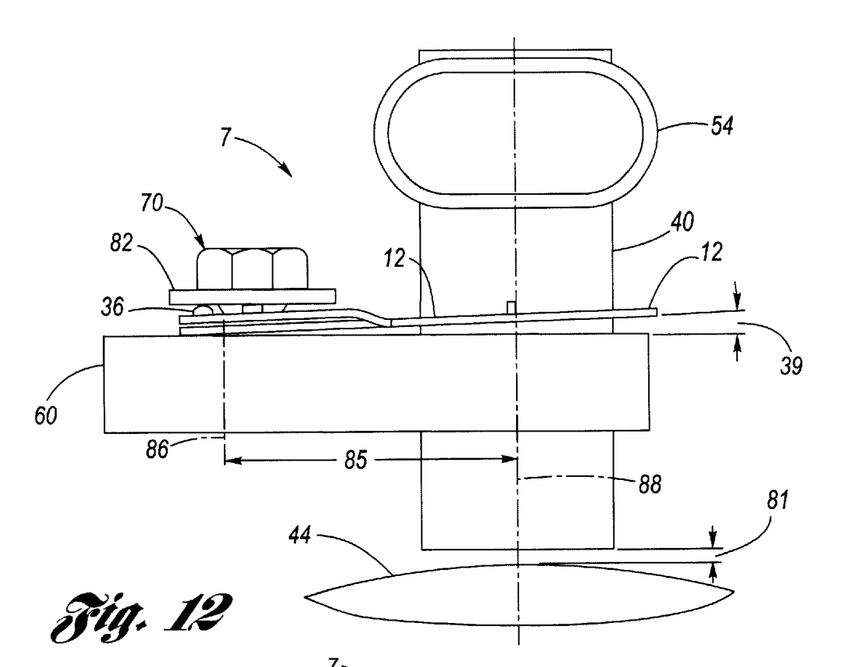
FIG. 12 is a side elevational view illustrating the achieved air gap when the fastener is fully inserted and is acting upon an angled portion of the bracket.
Figure 13:
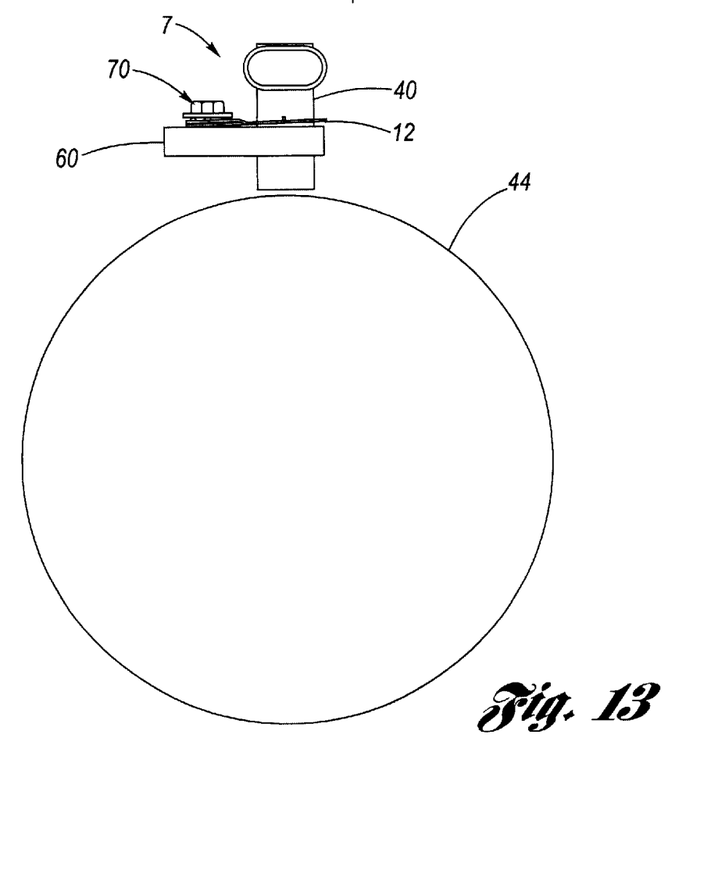
FIG. 13 is a perspective view of the sensor holding arrangement as shown in FIG. 12 illustrating a greater proportion of the target.

Referring additionally to FIGS. 8, 9 and 10 the sensor mounting arrangement 7 has a mount 60 which can be part of an engine casing. The mount 60 is spaced away from the target 44. The mount has a threaded bore 62. The bore 62 generally extends along a first axis 63 (FIG. 10). The first axis 63 is generally parallel to an axis 65 of the eyelet 12 (FIG. 3). The mount also has an opening for reception the sensor housing 40, typically referred to as the sensor port 64. A spacing between the sensor port 64 and the sensor housing 40 is typically sealed by an O-ring (not shown) which encircles the housing 40.

Figure 7:
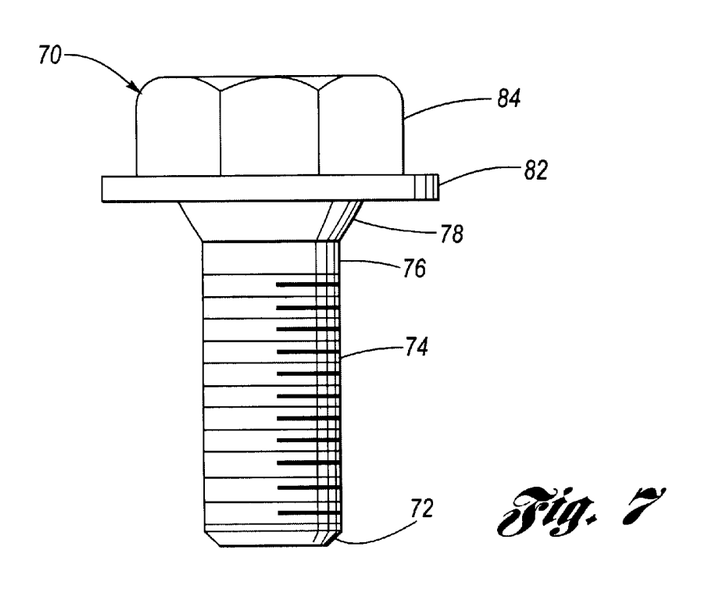
FIG. 7 is a front elevational view of the fastener shown in FIG. 5.

Referring additionally to FIG. 7, the sensor mounting arrangement 7 additionally includes a fastener 70. The fastener 70 is a bolt with a shank 72. The shank 72 has a threaded portion 74 and a smooth portion 76. The smooth portion 76 is adjacent to an upper end of the shank which is provided with a tapered portion 78. Adjacent to the tapered portion 78 is a fastener head 82 which includes a drive head 84 which in the example shown happens to be hexagonal.

Figure 1:
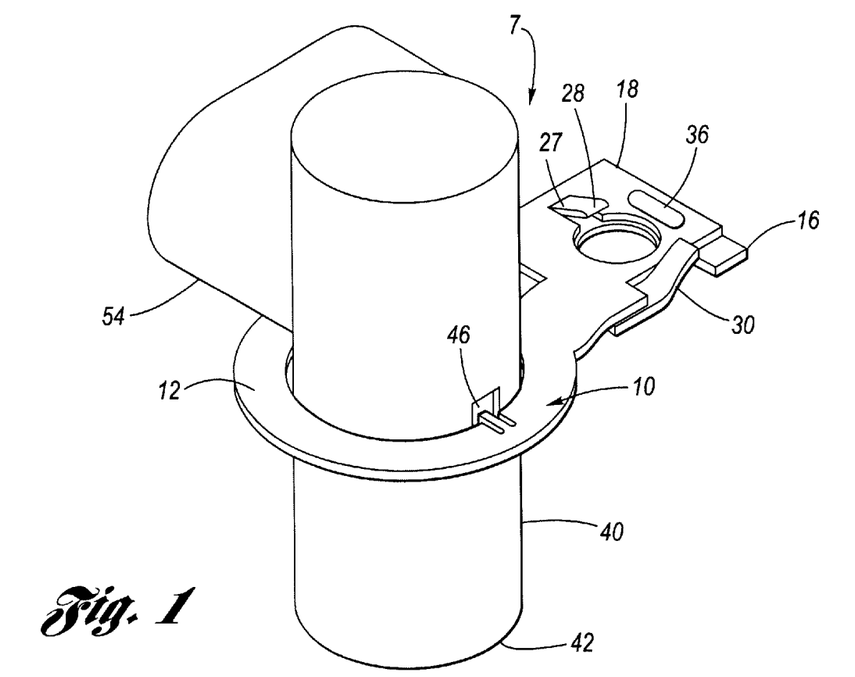
FIG. 1 is a perspective view of an arrangement for mounting a sensor at a fixed position according to the present invention illustrating a bracket member being connected with a sensor housing.

In operation, the housing 40 is inserted into the bracket eyelet 12. Typically, this is most easily accomplished before the biasing tab 30 on the lower end 16 is bent upward. The housing notches 46 are aligned with the eyelet tabs 25 (FIGS. 1 and 2). After this alignment is established, the biasing tab on the lower end 16 is bent upward to its position shown in FIGS. 1, 3 and 5 and the bracket 10 is connected with the sensor housing 40. The radially inward extreme edges 26 (as best shown in FIG. 2) of the eyelet tabs will be captured by the upper surface 52 and lower surface 48 of the housing notches 46.

Referring to FIG. 6, the housing 40 will be aligned for insertion into the port 64. Then O-ring (not shown) will be encircled about the housing 40 before insertion into the port 64. The shank 72 of the fastener 70 will be inserted within the fastener holes 22 and 24 of the bracket lower and upper ends 16 and 18. The fastener shank is thereafter inserted within the bore 62 of the mount (FIG. 5).

The fastener head 82 contacts the biasing tab 30 to urge the bracket 10 downward toward the mount 60. The movement of the bracket 10 causes the eyelet tab 25 radially inward extreme ends 26 to push downward on the notch lower surfaces 48 (FIGS. 7 and 10). The above-noted motion causes the extreme end 42 of the housing to contact the target 44 (FIG. 6). Further insertion of the fastener 70 will cause the fastener head 82 to deform the biasing tab 30. The biasing tab 30 will start to deform and the tapered portion 78 will come in contact with the wedge tab 27. The extreme edge 28 of the wedge tab engages the tapered portion 78 of the shank causing the bracket upper end 18 which is most adjacent to the fastener head 82 to be angularly displaced moving with respect to the bracket lower end 16 in a plane generally perpendicular to the axis 65 and accordingly reduce the diameter of the eyelet 12. The eyelet 12 then closes to capture the housing 40.

Continued insertion of the fastener 70 will bring the fastener head 82 in contact with the mound 36. As mentioned previously, the mound 36 overlies the angled portion 38 of the lower end 16. The bracket will be pivoted upward based upon the angle 39 that the angled portion 38 makes with the remainder of the bracket. This pivotal movement will cause the housing to be picked up from the target 44 an air gap distance 81 equal to the tan of angle 39 times the length a line from a boundary line 86 of the angled portion 38 to a centerline of the housing of the bracket from the target. The sensor is now positioned a fixed amount from the target 44 regardless of the stack-up intolerances of the various components.

One of the design criteria of the mounting arrangement 7 is that the force exerted by the eyelet tabs 26 on the housing should be greater than the force necessary to move the O-ring (not shown) which surrounds the housing within the port 26. In a similar manner, the force required for deformation of the biasing tab 30 by the bolt head 82 should be greater than the force required for permanent deformation of the eyelet tabs 25. In a similar fashion, the force required for the deformation of the wedge tab 27 should be greater than that required for deformation of the biasing tab 30. It is also apparent to those skilled in the art that the mound 36 need not be simply a dimple but can be an upset portion of the bracket end.

The present invention has been explained in an embodiment, however, it will be apparent to those skilled in the art of the various modifications to the invention which can be made without departing from the spirit and scope of the invention as it is encompassed by the following claims. It will also be apparent to those skilled in the art that the present invention has a multitude of applications beyond the environment of the automotive arts.

What is claimed is:

1. An arrangement for mounting a sensor at a fixed position with respect to a target, said arrangement comprising:
    a housing for said sensor;
    a mount spaced away from said target having a bore;
    a fastener for insertion into said bore said fastener having a shank with a tapered portion and a head, said fastener shank extending along a first axis; and
    a looped bracket having an eyelet for encircling said housing, said eyelet having an axis generally parallel with said first axis, said bracket having opposite at least partially overlapping ends with generally aligned holes for reception of said fastener shank, one of said bracket ends having a wedge tab, wherein said wedge tab makes contact with said fastener shank tapered portion upon insertion of said fastener into said bore to cause said overlapping ends to move with respect to one another in a plane generally perpendicular with the first axis to cause said bracket eyelet to close to capture said housing.

2. An arrangement as described in claim 1, wherein said mount has a port for reception of said housing.

3. An arrangement as described in claim 1, wherein said fastener is threaded.

4. An arrangement as described in claim 1, wherein said eyelet has a radial extending tab to engage said housing.

5. An arrangement as described in claim 4, wherein said eyelet has at least two tabs.

6. An arrangement as described in claim 4, wherein said housing has a notch for reception of said eyelet tab.

7. An arrangement as described in claim 1, wherein said wedge tab is on an end of said bracket which most adjacent to said fastener head.

8. An arrangement as described in claim 1, wherein said other bracket end has a biasing tab for making contact with said head of said fastener to cause said bracket to be urged toward said mount.

9. An arrangement as described in claim 8, wherein said biasing tab retains said bracket to said housing by restraining angular separation of said bracket ends.

10. An arrangement as described in claim 1, wherein said bracket end furthest away from said fastener head has an angled portion.

11. An arrangement as described in claim 10, wherein said bracket end angled portion is positioned on a side of said bracket end fastener hole opposite said eyelet.

12. An arrangement as described in claim 11, wherein said angled portion is between 1 and 5 degrees with a remainder of said bracket.

13. An arrangement as described in claim 12, wherein said angle is 2 degrees plus or minus 0.5 degrees.

14. An arrangement as described in claim 1, wherein said bracket end adjacent to said fastener head has a mound.

15. An arrangement for mounting a sensor at a fixed position with respect to a target, said arrangement comprising:
    a housing for said sensor;
    a mount spaced away from said sensor having a bore;
    a threaded fastener with a head for insertion into said bore, said fastener having a shank with a tapered portion, said fastener shank extending along a first axis;
    a looped bracket having an eyelet for encircling said housing, said eyelet having an axis generally parallel with said first axis, said bracket having at least partially overlapping ends having generally aligned holes for reception of said fastener shank, said bracket end most adjacent to said fastener head having a wedge tab and said other bracket end having an angled portion; and
    wherein insertion of said fastener within said bore causes said fastener tapered portion to contact said wedge tab causing said overlapping ends to move with respect to one another in a plane generally perpendicular with the first axis, causing said bracket eyelet to capture said housing and wherein further insertion of said fastener causes said bracket to angularly displace said housing with respect to said mount.

16. An arrangement for mounting a sensor at a fixed position with respect to a target, said arrangement comprising:
    a housing for said sensor, said housing having a notch on its outer perimeter;
    a mount spaced away from said target having a bore;
    a threaded fastener with a head for insertion into said bore, said fastener having a shank with a tapered portion, said fastener shank extending along a first axis;
    a looped bracket having an eyelet encircling said housing, said eyelet having an axis generally parallel with said first axis, said eyelet having a radial tab for reception into said housing notch, said bracket having at least partially overlapping ends having generally aligned holes for reception of said fastener shank, said bracket end most adjacent to said fastener head having a wedge tab and a mound, said other bracket end having an angled portion, a biasing tab; and
    wherein insertion of said fastener within said bore causes said fastener head causes said biasing tab to place said bracket adjacent to said mount and to cause said eyelet tab to urge said housing to contact said target and to cause said wedge tab to make contact with said fastener tapered portion to said eyelet ends to move in a plane generally perpendicular with the first axis to cause said bracket eyelet to capture said housing and wherein further insertion of said fastener causes said bracket to angularly displace said housing with respect to said mount.

17. A method for mounting a sensor connected with a housing at a fixed position with respect to a target, said method comprising:
    providing a mount spaced away from said target having a threaded bore;
    encircling said housing with a looped bracket having an eyelet for said housing engaging said housing, said bracket having opposite, at least partially overlapping ends with generally aligned holes for alignment with said bore of said mount and one of said ends having a wedge tab and one of said ends having an angled portion;

inserting a threaded fastener having a shank with a tapered portion and a head through said holes of said bracket ends and into said bore of said mount, with said fastener shank extending in a first axis generally parallel with an axis of said bracket eyelet;

allowing said housing to contact said target; and further inserting said fastener to cause said tapered portion of said shank to engage said wedge tab causing said eyelet ends to move in a plane generally perpendicular with said cause said eyelet of said bracket to capture said housing and further inserting said fastener to cause said fastener to push down on said bracket end angled portion causing said bracket to displace said housing from said target at a generally fixed position therefrom.

18. A method as described in claim 17 further comprising providing a biasing tab on an end of said bracket generally opposite said end which tab is on to prevent angular separation between said bracket ends to connect said bracket with said housing.

19. A method as described in claim 17 further comprising providing on said bracket end most adjacent to said fastener a mound for engagement with said fastener head to cause said fastener bracket to have contact with said mount about said fastener bracket angled portion.

20. A method as described in claim 17, further comprising providing a notch in said housing and providing a tab on said eyelet and urging said housing into contact with said target with said eyelet tab.

21. An arrangement for mounting a sensor at a fixed position with respect to a target, said arrangement comprising:

a housing for said sensor;

a mount spaced away from said target having a bore generally extending along a first axis;

a fastener for insertion into said bore said fastener having a shank with a tapered portion and a head, said fastener shank extending along a first axis; and a looped bracket having an eyelet for encircling said housing, said eyelet having an axis nearly parallel with said first axis, said bracket having opposite at least partially overlapping ends with generally aligned holes for reception of said fastener shank, one of said bracket ends having a wedge tab, wherein said wedge tab makes contact with said fastener shank tapered portion upon insertion of said fastener into said bore to cause said bracket ends to move with respect to one another in a plane generally perpendicular with the first axis to cause said bracket eyelet to close to capture said housing.

* * * * *